United States Patent
Kanai et al.

(10) Patent No.: US 11,336,195 B2
(45) Date of Patent: May 17, 2022

(54) POWER CONVERSION APPARATUS THAT DETERMINES, BASED ON A SET OF DATA, WHETHER IT IS OPERABLE TO PERFORM AN OUTPUT

(71) Applicant: NETUREN CO., LTD., Tokyo (JP)

(72) Inventors: Takahiko Kanai, Tokyo (JP); Haruki Yoshida, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 76 days.

(21) Appl. No.: 16/765,039

(22) PCT Filed: Nov. 19, 2018

(86) PCT No.: PCT/JP2018/042729
§ 371 (c)(1),
(2) Date: May 18, 2020

(87) PCT Pub. No.: WO2019/102973
PCT Pub. Date: May 31, 2019

(65) Prior Publication Data
US 2020/0403522 A1  Dec. 24, 2020

(30) Foreign Application Priority Data
Nov. 21, 2017 (JP) .............................. JP2017-223774

(51) Int. Cl.
*H02M 1/32* (2007.01)
*H02M 5/458* (2006.01)
(Continued)

(52) U.S. Cl.
CPC ............. *H02M 5/458* (2013.01); *H02M 1/32* (2013.01); *H02M 7/537* (2013.01); *H05B 6/04* (2013.01);
(Continued)

(58) Field of Classification Search
CPC ........ H02M 1/32; H02M 1/327; H02M 5/458; H02M 7/4815; H02M 7/537; H05B 6/04; H05B 6/06; Y02B 70/10
See application file for complete search history.

(56) References Cited

U.S. PATENT DOCUMENTS

2012/0018426 A1\*  1/2012  Brosnan .................. H05B 6/04
219/672
2012/0305546 A1\*  12/2012  Filippa ................... H05B 6/062
219/660
(Continued)

FOREIGN PATENT DOCUMENTS

JP    2015-117425    6/2015
JP    2017-11835     1/2017
(Continued)

OTHER PUBLICATIONS

International Search Report and Written Opinion of the International Searching Authority, dated Feb. 15, 2019 in corresponding International Patent Application No. PCT/JP2018/042729.
(Continued)

*Primary Examiner* — Kyle J Moody
*Assistant Examiner* — Jye-June Lee
(74) *Attorney, Agent, or Firm* — Wenderoth, Lind & Ponack, L.L.P.

(57) ABSTRACT

A power conversion apparatus includes a rectifier to convert AC power into constant-current DC power, a resonant inverter to convert the DC power into AC power to be output to a load, and a control unit to receive settings of an output current value of the inverter, a current-supplying time of the inverter, an operation rate defined by dividing the current-supplying time by a sum of the current-supplying time and a non-current-supplying time, and a resonance frequency of the load. The control unit operates the rectifier and the inverter only when it determines that it is operable to
(Continued)

perform an output in accordance with the set conditions, based on data in which the output frequency, the current-supplying time and the operation rate are associated with an allowable output current value of the inverter at a temperature equal to or lower than a maximum operable temperature of a switching device.

2 Claims, 5 Drawing Sheets

(51) Int. Cl.
  *H02M 7/537* (2006.01)
  *H05B 6/04* (2006.01)
  *H05B 6/06* (2006.01)
  *H02M 7/48* (2007.01)

(52) U.S. Cl.
  CPC .............. *H05B 6/06* (2013.01); *H02M 1/327* (2021.05); *H02M 7/4815* (2021.05)

(56) References Cited

U.S. PATENT DOCUMENTS

| | | | |
|---|---|---|---|
| 2017/0027025 A1* | 1/2017 | Kanai | ..................... H02M 1/32 |
| 2018/0175722 A1* | 6/2018 | Kanai | ..................... H02M 1/32 |
| 2019/0289680 A1 | 9/2019 | Kanai et al. | |

FOREIGN PATENT DOCUMENTS

| | | |
|---|---|---|
| WO | 2015/093623 | 6/2015 |
| WO | 2016/203706 | 12/2016 |

OTHER PUBLICATIONS

A pamphlet of MK16A Transistor Inverter, Neturen Co., Ltd., www.kneturen.co.jp/Portals/0/images/products/ihsystem/pdf/MK16Aenglish.pdf.

* cited by examiner

POWER CONVERSION APPARATUS THAT DETERMINES, BASED ON A SET OF DATA, WHETHER IT IS OPERABLE TO PERFORM AN OUTPUT

TECHNICAL FILED

The present invention relates to a power conversion apparatus and a method for controlling the power conversion apparatus.

BACKGROUND ART

An induction heating is one of the heating methods used for a heat treatment on a work made of a steel or the like. Quenching is an example of the heat treatment using the induction heating. When performing the quenching, a frequency is selected depending on a quenching depth.

A related art power conversion apparatus is configured to convert DC power into high-frequency AC power using power a semiconductor device as a switching device (see, e.g., a pamphlet of MK16A Transistor Inverter, Neturen Co., Ltd., www.k-neturen.co.jp/Portals/0/images/products/ihsystem/pdf/MK16Aenglish.pdf). The power semiconductor device may be, for example, a thyristor device for an output frequency of less than 10 kHz, an insulated gate bipolar transistor (IGBT) for an output frequency ranging from 10 kHz to 100 kHz, or a metal-oxide semiconductor field-effect transistor (MOSFET) for an output frequency exceeding 100 kHz.

When the output frequency of 100 kHz is compared with the output frequency of 10 kHz, a switching loss of the power semiconductor device is ten times larger, and a temperature rise of the power semiconductor device is also significantly different. Thus, if the maximum rated value of an inverter of the power conversion apparatus is determine and fixed based on the maximum frequency of an operation range of the apparatus and with an assumption of continuous output, an operation with a lower output frequency and/or a short-time output would be uneconomical due to the limitation posed by the maximum rated value although the power semiconductor device shows a small temperature rise and is capable of providing higher output.

Therefore, according to another related art, a power conversion apparatus includes a rectifier configured to convert AC power into DC power, a smoothing filter configured to smoothen the DC power converted by the rectifier, an inverter configured to convert the DC power smoothed by the smoothing filter into high-frequency AC power through on and off of a switching device, and a control unit configured to operate the rectifier and the inverter. The control unit is configured to change the maximum rated value of the inverter within a temperature range in which the switching device can be used, depending on an operating condition of the apparatus, such as an output frequency (see, e.g., JP2015-117425A and JP2017-011835A).

Specifically, the control unit uses a set of data in which an output frequency, a current-supplying time, an operation rate (the current-supplying time divided by a sum of the current-supplying time and a non-current-supplying time), and power at a temperature at which the switching device can be used are associated with one another, so that when the current-supplying time and the operation rate are set, the control unit calculates, based on the set of data, the maximum allowable current which can pass through the switching device under the set conditions and depending on the output frequency.

The related art power conversion apparatuses are based on the supposition that a load includes a parallel resonance circuit, and the rectifier is configured to convert AC power into constant-voltage DC power. Since the voltage-constant control is performed, it is difficult to know how much current will pass through the switching device without actually applying electric current. Therefore, in the related art power conversion apparatuses, the control unit detects output current of the rectifier based on a current feedback signal from the rectifier, and stops or lowers the output when the detected current exceeds the maximum allowable current. The conditions of the current-supplying time and the operation rate are then reset, but the condition setting are repeated, so that it takes time to set an output condition.

SUMMARY

Illustrative aspects of the present invention provide a power conversion apparatus capable of reducing time required for setting output conditions, and a method for controlling the power conversion apparatus.

According to an illustrative aspect of the present invention, a power conversion apparatus includes a rectifier configured to convert AC power into constant-current DC power, a resonant inverter having a switching device, the resonant inverter being configured to convert the DC power received from the rectifier into AC power through on and off of the switching device and to output the AC power to a load, and a control unit configured to receive settings of an output current value of the inverter, a current-supplying time of the inverter, and an operation rate of the inverter defined by dividing the current-supplying time by a sum of the current-supplying time and a non-current-supplying time, and to operate the rectifier and the inverter based on the output current value, the current-supplying time, and the operation rate of the inverter that have been set. The control unit is configured to further receive a setting of a resonance frequency of the load. The control unit is configured to determine, based on a set of data in which the output frequency, the current-supplying time and the operation rate of the inverter are associated with an allowable output current value of the inverter at a temperature equal to or lower than a maximum operable temperature of the switching device, whether the power conversion apparatus is operable to perform an output in accordance with the output current value, the current-supplying time, the operation rate, and the resonance frequency that have been set, and to operate the rectifier and the inverter only when the control unit determines that the power conversion apparatus is operable to perform the output.

According to another illustrative aspect of the present invention, a method for controlling the power conversion apparatus is provided. The method is performed by the control unit. The method includes steps of receiving an input for setting the output current value of the inverter, the current-supplying time of the inverter, the operation rate of the inverter and the resonance frequency of the load, determining whether the power conversion apparatus is operable to perform an output in accordance with the output current value, the current-supplying time, the operation rate, and the resonance frequency that have been set, based on a set of data in which the output frequency, the current-supplying time, and the operation rate of the inverter are associated with an allowable output current value of the inverter at a temperature equal to or lower than a maximum operable temperature of the switching device, and operating the rectifier and the inverter only when it is determined that power conversion apparatus is operable to perform the output.

According to another illustrative aspect of the present invention, a computer program is provided. When executed by a computer, the computer program causes the computer to execute the method described above. The computer program may be stored in a non-transitory computer readable medium.

DESCRIPTION OF EMBODIMENTS

Figure 1:
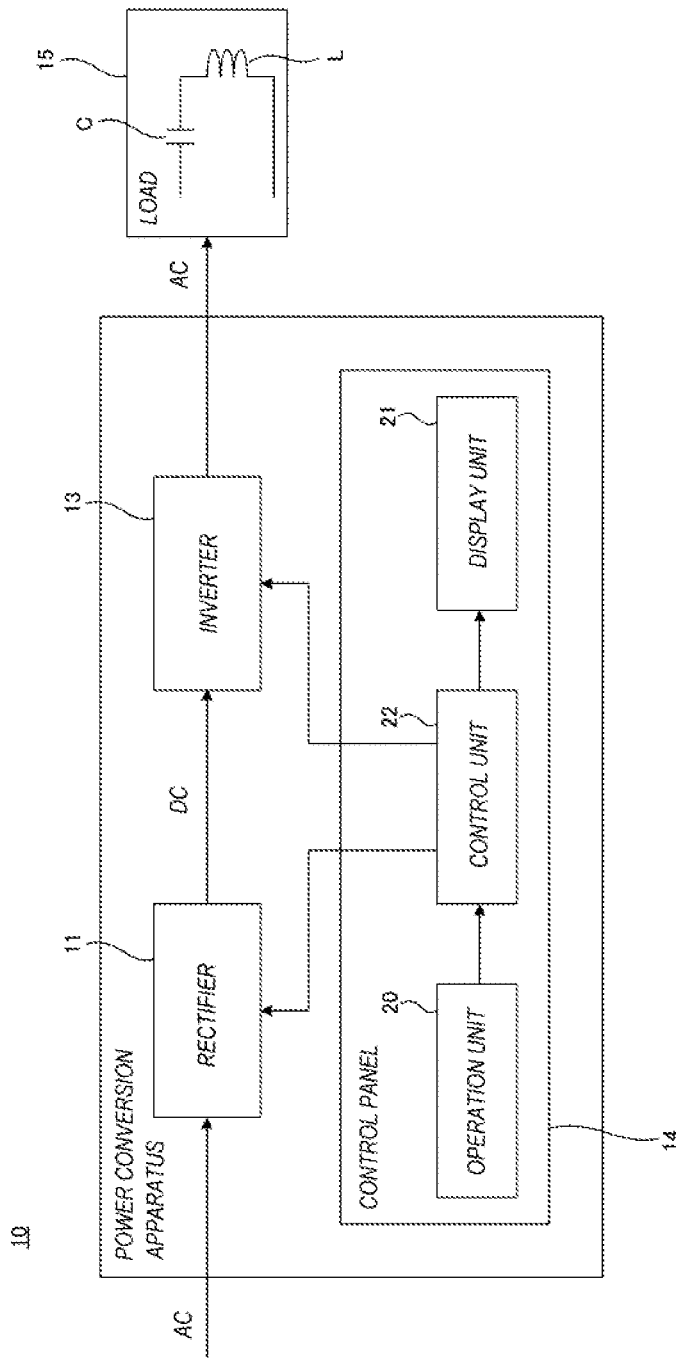
FIG. 1 is a block diagram illustrating an example of a power conversion apparatus according to an embodiment of the invention.

FIG. 1 illustrates a power conversion apparatus according to an embodiment of the present invention.

The power conversion apparatus 10 includes a rectifier 11 for converting AC power supplied from a commercial power supply or the like into constant-current DC power, an inverter 13 for converting the DC power received from the rectifier 11 to AC power, and a control panel 14 for operating control circuits (not illustrated) of the rectifier 11 and the inverter 13.

The inverter 13 has an output connected to a load 15, and the load 15 includes a capacitor C and a heating coil L for induction-heating a workpiece made of a steel or the like. The heating coil L and the capacitor C are connected in series to the output of the inverter 13, and form a serial resonance circuit.

The rectifier 11 converts a smoothed voltage into a DC voltage such that the smoothed voltage is variable, using a smoothing capacitor and a semiconductor device such as a thyristor, which can control conduction based on an external signal. The conduction of the semiconductor device is controlled by the control circuit such that the current is kept constant by changing the smoothed voltage. To control a rush current into the smoothing capacitor, a reactor may further be used.

The inverter 13 includes a plurality of switching devices connected in a bridged manner, and is configured to convert constant-current DC power received from the rectifier 11 into AC power through on and off operations of the switching devices. The on and off operations of the switching devices, or in other words the output frequency of the inverter 13, may be controlled by the control circuit. During this control, the output frequency is gradually lowered from the maximum frequency within an operation range of the inverter 13, and maintained at the resonance frequency of the load 15, which is detected while the output frequency is lowered.

The switching device may include various types of power semiconductor devices capable of performing a switching operation, such as an insulated gate bipolar transistor (IGBT) and metal-oxide-semiconductor field-effect transistor (MOSFET), and silicon (Si) or silicon carbide (SiC) may be used as a semiconductor material.

Figure 2:
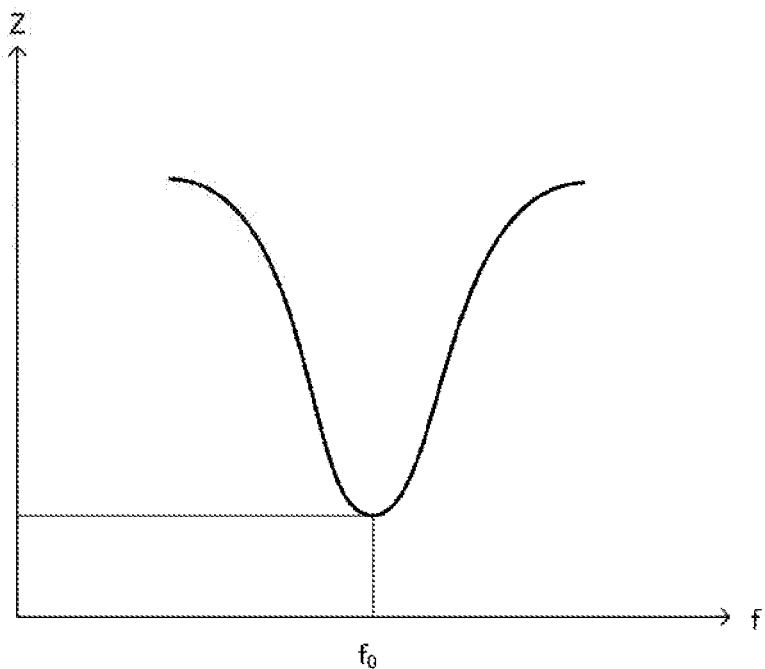
FIG. 2 is a graph illustrating an example of an impedance change of a load connected to an output of the power conversion apparatus of FIG. 1.

FIG. 2 illustrates an impedance change of the load 15.

As illustrated in FIG. 2, impedance Z of the load 15 forming the serial resonance circuit is typically minimized at a resonance frequency f0. The power conversion apparatus 10 to which the load 15 is connected is configured to output a constant current. That is because, when the power conversion apparatus 10 is configured to output a constant voltage, a current decided by the impedance Z of the load 15 is output, but the inverter 13 is operated at the resonance frequency f0 at which the impedance Z of the load 15 is minimized, and a large amount of current may flow into the inverter 13. Furthermore, when an output for the serial resonance circuit is controlled at a constant voltage, a square wave current is applied to the heating coil (inductor) L, and a voltage of Lxdi/dt is generated across the inductor L. However, since di/dt of the square wave current is significantly high, a steep voltage is generated across the inductor L.

Although not illustrated, the impedance of the load forming the parallel resonance circuit (the load including the heating coil L and the capacitor C which are connected in parallel to the output of the inverter) is typically maximized at the resonance frequency, and the power conversion apparatus to which the load is connected is configured to output a constant voltage. That is because, when the power conversion apparatus is configured to output a constant current, a voltage decided by the impedance of the load is output, but the inverter is operated at the resonance frequency at which the impedance of the load is maximized, and a high voltage may be applied to the reverse conversion unit. When the output for the parallel resonance circuit is controlled to a constant current, a square wave voltage is applied to the capacitor C, and a current of Cxdv/dt flows into the capacitor C. However, since dv/dt of the square wave voltage is significantly high, a steep current may flow into the capacitor C.

Referring back to FIG. 1, the control panel 14 for operating the control circuits of the rectifier 11 and the inverter 13 includes an operation unit 20, a display unit 21 and a control unit 22.

The operation unit 20 includes a hardware key such as a switch, and is used to receive various operations by an operator. The display unit 21 includes a display device such as a liquid crystal display (LCD), for example, and displays an operation screen or the like. As the control unit 22, a computer such as a programmable logic controller (PLC) may be used. The control unit 22 includes one or more processors and a memory device for storing programs executed by the processors and data required for executing the programs. The memory device may include a read only memory (ROM), a random access memory (RAM) and the like. As the processor executes a program, the control unit 22 operates the control circuits of the rectifier 11 and the inverter 13. Hereafter, the process executed by the control unit 22 will be described.

Setting Step

To operate the control circuits of the rectifier 11 and the inverter 13, the control unit 22 receives input values through the operation unit 20 for setting an output current value of the inverter 13, a current-supplying time of the inverter 13, an operation rate of the inverter 13 and the resonance frequency of the load 15, and sets the output current value, the current-supplying time, the operation rate and the resonance frequency based on the input values.

Figure 3:
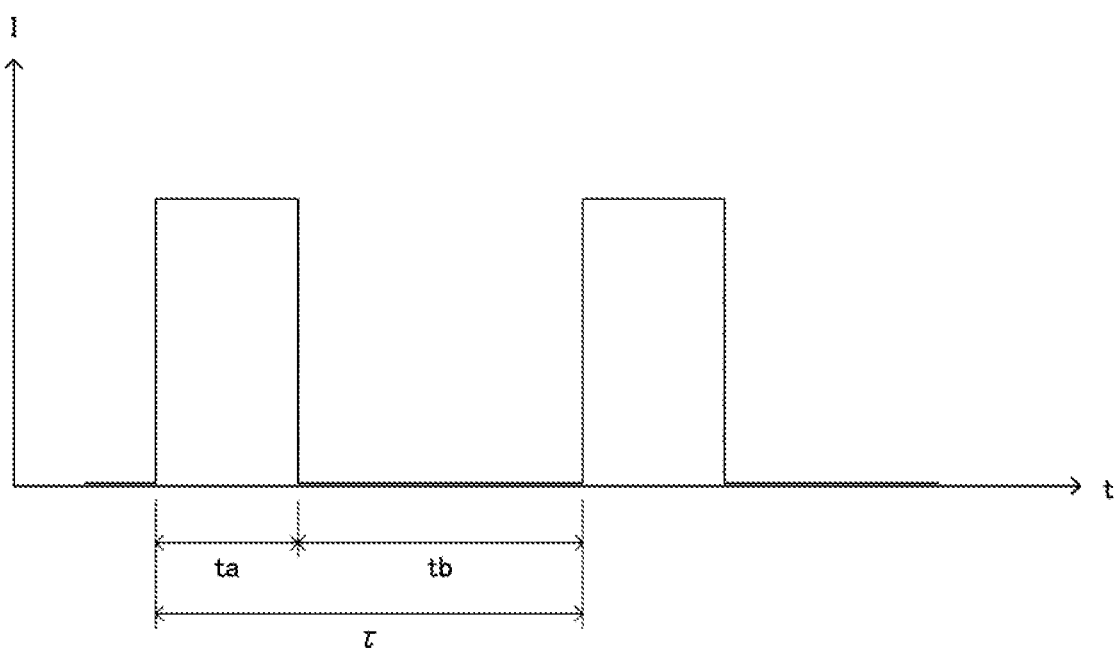
FIG. 3 is a graph illustrating an example of a conduction pattern of an inverter.

Referring to FIG. 3, the current-supplying time and the operation rate will be described.

During induction heating of a workpiece, the time during which AC power is output to the heating coil L from the inverter 13 may range from several seconds to several tens of seconds depending on the workpiece. When the next workpiece is installed in an induction heating apparatus after induction heating for one work has been completed, the AC power is output to the heating coil from the inverter 13. A current-supplying time ta indicates the time during which the AC power is output from the inverter 13, and corresponds to a time required for completing induction heating for one work. A non-current-supplying time tb indicates the time during which AC power is not output from the inverter 13, and corresponds to a time required until induction heating for the next work is started after induction heating for one work has been completed.

The operation rate α of the inverter 13 is defined as the ratio of the current-supplying time to a period τ by the following equation, the proiod τ being the sum of the current-supplying time ta and the non-current-supplying time tb. The operation rate α=100% means a continuous output. When setting the operation rate α, the operation rate α may be input directly, or the current-supplying time ta and the non-current-supplying time tb may be input.

$$\alpha = ta/\tau = ta/(ta+tb)$$

Determination Step

The control unit 22 determines whether an output is possible, based on the output current value, the current-supplying time, the operation rate and the resonance frequency, which were set at the setting step. In order to determine whether an output is possible, the control unit 22 uses data in which the output frequency, the current-supplying time and the operation rate of the inverter 13 and an allowable output current value at a predetermined temperature equal to or lower than the maximum operable temperature of the switching device included in the inverter 13 are associated with each other. The data are stored in the memory device of the control unit 22 in advance.

Figure 4:
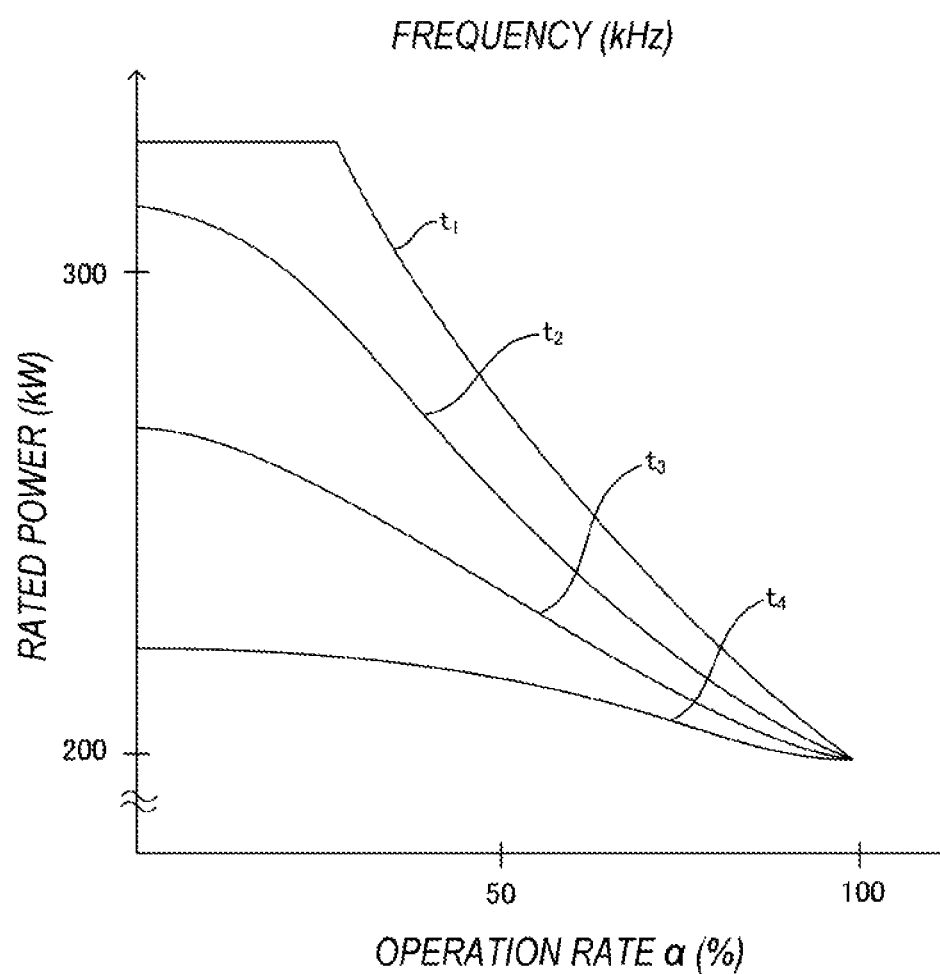
FIG. 4 is a graph illustrating an example of data used for determining whether an output is possible.
Figure 5:
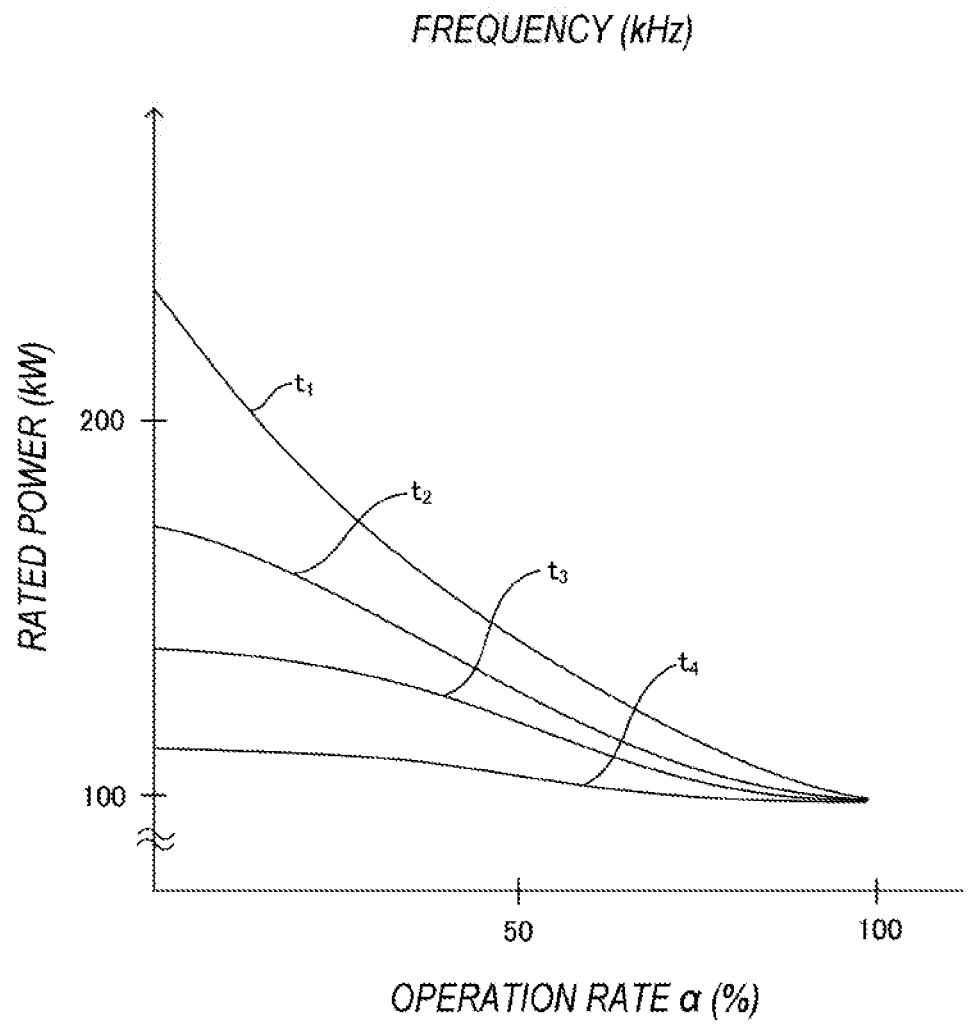
FIG. 5 is a graph illustrating another example of data used for determining whether an output is possible.

Referring to FIGS. 4 and 5, the data used for determining whether an output is possible will be described.

In graphs illustrated in FIGS. 4 and 5, the horizontal axis represents the operation rate α (%), and the vertical axis represents the rated power (kW). FIGS. 4 and 5 illustrate the relation between the operation rate for each of the current-supplying times t1 to t4 (t1<t2<3<t4) and the rated power calculated from the allowable output current value at which the temperature of the switching device reaches a predetermined temperature equal to or lower than the maximum operable temperature, for frequencies f1 and f2 (f1<f2).

The temperature of the switching device is defined by cooling and a loss of the switching device, and the loss of the switching device is expressed by the following equation.

loss of switching device=steady loss+switching loss

Here, the steady loss indicates a loss caused by conduction of the switching device, and depends on the output current value and the current-supplying time. The switching loss is a loss caused by on and off of the switching devices, and depends on the frequency (switching count) and the current-supplying time.

Therefore, when the frequency is high even though the same current is applied at the same operation rate during the same current-supplying time, the switching loss increases, and the temperature of the switching device rises. In other words, when a temperature rise for the loss of the switching device is constantly maintained regardless of the temperature of the switching device while the same current-supplying time and the same operation rate are applied, the allowable output current value and the rated power converted from the allowable output current value can be increased by lowering the frequency. When the data of the frequency f1 in FIG. 4 and the data of the frequency f2 in FIG. 5 (f1<f2) are compared to each other for the rated powers at the same operation rate during the same current-supplying time, the rated power at the relatively low frequency f1 is larger than the rated power at the frequency f2.

Furthermore, suppose that the same current is applied at the same frequency and the same operation rate, during an intermittent output in which the operation rate is less than 100%. In this case, when the current-supplying time is increased, the steady loss and the switching loss are increased, and the temperature of the switching device rises. Moreover, suppose that the same current is applied at the same frequency during the same current-supplying time. In this case, when the operation rate is high, the switching device is insufficiently cooled, and the temperature of the switching device rises. In other words, when the same frequency and the same operation rate are applied, the allowable output current value and the rated power convened from the allowable output current value can be increased by reducing the current-supplying time. Furthermore, when the same frequency and the same current-supplying time are applied, the allowable output current value and the rated power converted from the allowable output current value can be increased by lowering the operation rate. For example, when the rated powers of the current-supplying times t1 to t4 (t1<2<t3<t4) at the same operation rate are compared to each other for the data of the frequency f2 in FIG. 5, a rated power for a relatively short current-supplying time is larger than a rated power for a relatively long current-supplying time. Furthermore, in the case of the rated power for the current-supplying time t1, the rated power is increased as the operation rate gets lower. During a continuous output in which the operation rate is 100%, the rated powers are equal to each other.

Hereafter, a method for calculating the allowable current value will be described.

Figure 6A:
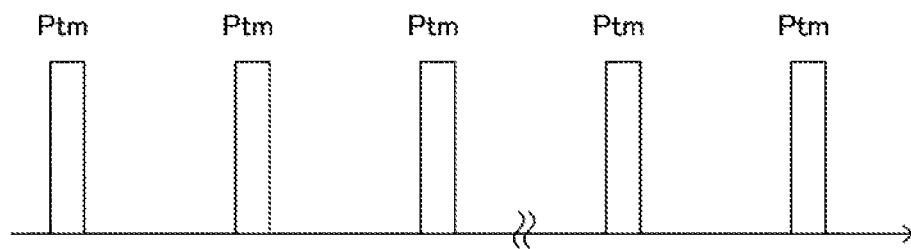
FIG. 6A is a diagram illustrating an example of a method for calculating an allowable current value of a switching device.
Figure 6B:
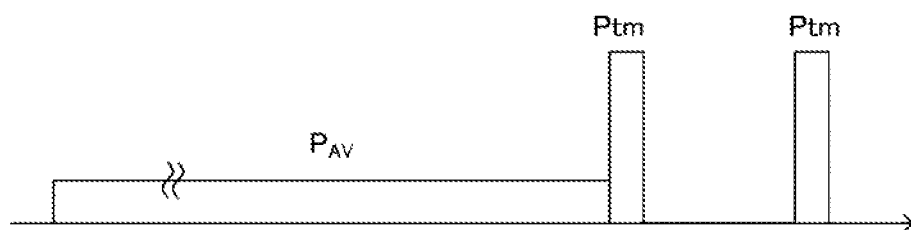
FIG. 6B is another diagram illustrating the example of the method for calculating the allowable current value.
Figure 6C:
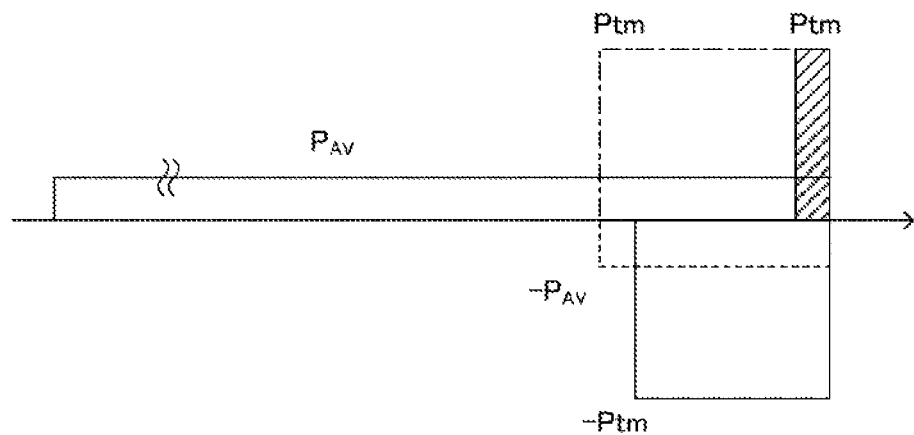
FIG. 6C is another diagram illustrating the example of the method for calculating the allowable current value.

FIGS. 6A to 6C illustrate a calculation method when the temperature of the switching device (junction temperature) is calculated from a current obtained by approximating a regularly repeated current or an actual sine wave to a square wave for heat calculation. When a current-supplying time for a power loss Ptm is set to tp and the period is set to τ as illustrated in FIG. 6A, pulses excluding two pulses immediately adjacent to each other are averaged to approximate a power loss as illustrated in FIG. 6B, and the superposition theory is applied to the power loss as illustrated in FIG. 6C. Accordingly, the junction temperature of the switching device is calculated.

The junction temperature Tj of the switching device is calculated by the following equation, based on the regularly repeated square wave current.

$$Tj = Tw + Ptm\{(tp/\tau) \cdot R(j-w) + (1-tp/\tau) \cdot R(j-w)(\tau+tp) - R(j-w)(\tau) + R(j-w)(tp)\}$$

The above equation is modified as follows.

$$Tj-Tw=(T\infty+T3-T2+T1)\cdot Ptm$$

where $T\infty=(tp/\tau)\cdot R(j-w)$
$T3=(1-tp/\tau)\cdot R(j-w)(\tau+tp)$
$T2=R(j-w)(\tau)$
$T1=R(j-w)(tp)$ $T\infty$ represents that the ratio of the conduction rate of the loss $(tp/\tau)$ is applied for the infinite time, and is calculated by the conduction rate $(tp/\tau)\times$thermal resistance during continuous rating.

T3 represents subtracting the ratio of the conduction rate of the loss $(tp/\tau)$ at time $\tau+tp$ from the loss at time $\tau+tp$.

T2 represents subtracting a loss at timer.

T1 represents adding a loss at time tp.

Here, $\tau$ represents a repetition time, and $R(j-w)(t)$ represents a transient thermal resistance (° C./W) at time t. Tw represents the temperature ° C. of cooling water.

The loss can be calculated by the sum of a steady loss and switching loss which are calculated as follows. The steady loss can be calculated through an operation of multiplying a loss value measured at a certain current by a loss increase rate based on a current increase and a loss increase rate of the switching device by the current increase. The switching loss can be calculated through an operation of multiplying the value of a switching loss per 1 kHz, for example, by a frequency for the value and adding the current increase to the resultant value.

Then, a current value is calculated, which satisfies the relation that a value obtained by multiplying the sum of the steady loss and the switching loss and (T∞+T3−T2+T1) becomes equal to or less than a predetermined temperature. The current value can be set to the allowable output current value. The predetermined temperature can be decided by the used switching device, set to the maximum operable temperature of the switching device, and set to a temperature obtained by multiplying a proper safety rate by the maximum operable temperature.

The control unit 22 refers to the data corresponding to the set resonance frequency, and compares the set current value to the allowable output current value corresponding to the set current-supplying time and the set operation rate within the data. When the set current value is equal to or less than the allowable output current value, the control unit 22 determines that the power conversion apparatus 10 is operable to perform an output in accordance with the current value, the current-supplying time and the operation rate that have been set. When the set current value exceeds the allowable output current value, the control unit 22 determines that the power conversion apparatus 10 is not operable to perform the output.

Output Step

When it is determined that the power conversion apparatus 10 is operable to perform the output, the control unit 22 operates the control circuits of the rectifier 11 and the inverter 13 based on the output current value, the current-supplying time and the operation rate that have been set.

When it is determined that the power conversion apparatus 10 is not operable to perform the output, the control unit 22 does not operate the control circuits of the rectifier 11 and the inverter 13, and displays the determination result on the display unit 21 to inform the operator that the power conversion apparatus 10 is not operable to perform the output with the output current value, the current-supplying time, the operation rate and the resonance frequency (the output frequency of the inverter 13) that have been set. In this case, one or more parameters of the output current value, the current-supplying time, the operation rate and the resonance frequency are properly changed by the operator. The resonance frequency (the output frequency of the inverter 13) can be changed by, for example, increasing or decreasing the capacitance of the capacitor C included in the load 15.

As such, the power conversion apparatus 10 changes the maximum rated value of the inverter 13 within a temperature range in which the switching device can be used, according to the output current value, the current-supplying time, the operation rate and the output frequency of the inverter 13. Therefore, the power conversion apparatus 10 can efficiently utilize an output margin which occurs as the output frequency decreases.

The power conversion apparatus 10 is configured to output a constant current at the set output current value, and determines whether the power conversion apparatus 10 is operable to perform an output in accordance with the output current value, the current-supplying time, and the operation rate that have been set, using the set of data in which the output frequency, the current-supplying time and the operation rate are associated with the allowable output current value at the predetermined temperature equal to or lower than the maximum operable temperature of the switching device included in the inverter 13. Therefore, the power conversion apparatus 10 can determine whether it can perform an output, without actually applying the current. Accordingly, the power conversion apparatus 10 can reduce time required for setting the output conditions (the output current value, the current-supplying time and the operation rate).

Changing Step

When it is determined that the power conversion apparatus 10 is not operable to perform the output, the control unit 22 may calculate a frequency and an operation rate at which it is determined that the power conversion apparatus 10 is operable to perform the output, and display the calculated frequency and the calculated operation rate on the display unit 21.

The frequency calculated by the control unit 22 may be, for example, lower than the set resonance frequency, and may be a frequency at which the power conversion apparatus 10 is operable to perform an output with the output current value, the current-supplying time and the operation rate that have been set. As illustrated in FIGS. 4 and 5, the control unit 22 can reduce the frequency to increase the allowable output current value and the rated power converted from the allowable output current value even at the same operation rate during the same current-supplying time, and operate the rectifier 11 and the inverter 13 at the set output current value, current-supplying time and operation rate.

The operation rate calculated by the control unit 22 may be lower than the set operation rate, and can be set to an operation rate at which the power conversion apparatus 10 is operable to perform an output with the output current value, the current-supplying time and the resonance frequency that have been set. For example, as illustrated in FIG. 5, the control unit 22 can reduce the operation rate to increase the allowable output current value and the rated power converted from the allowable output current value even at the same frequency during the same current-supplying time, and operate the rectifier 11 and the inverter 13 with the output current value, the current-supplying time and the resonance frequency (the output frequency of the inverter 13) that have been set.

Based on the set of data in which the output frequency, the current-supplying time and the operation rate are associated with the allowable current value at the predetermined temperature equal to or lower than the maximum operable temperature of the switching device included in the inverter 13, the control unit 22 can calculate the frequency or operation rate at which it is determined that the output is possible, and display the calculated frequency or operation rate on the display unit 21. In this case, the control unit 22 can further reduce time required for setting the output conditions, thereby increasing the convenience of the power conversion apparatus 10.

The above-described steps performed by the control unit 22 can be provided as a program for causing a computer to execute the steps. Such a program can be stored in a non-transitory computer-readable recording medium, and then provided. Such a computer-readable recording medium includes an optical medium such as compact disk-ROM (CD-ROM) or a magnetic recording medium such as a memory card. Such a program can be downloaded through a network.

As described above, according to an aspect of the presently disclosed subject matter, a power conversion apparatus includes a rectifier configured to convert AC power into constant-current DC power, a resonant inverter having a switching device, the resonant inverter being configured to convert the DC power received from the rectifier into AC power through on and off of the switching device and to output the AC power to a load, and a control unit configured to receive settings of an output current value of the inverter, a current-supplying time of the inverter, and an operation rate of the inverter defined by dividing the current-supplying time by a sum of the current-supplying time and a non-current-supplying time, and to operate the rectifier and the inverter based on the output current value, the current-supplying time, and the operation rate of the inverter that have been set. The control unit is configured to further receive a setting of a resonance frequency of the load. The control unit is configured to determine, based on a set of data in which the output frequency, the current-supplying time and the operation rate of the inverter are associated with an allowable output current value of the inverter at a temperature equal to or lower than a maximum operable temperature of the switching device, whether the power conversion apparatus is operable to perform an output in accordance with the output current value, the current-supplying time, the operation rate, and the resonance frequency that have been set, and to operate the rectifier and the inverter only when the control unit determines that the power conversion apparatus is operable to perform the output.

The power conversion apparatus may further include the display unit. When the control unit determines that the power conversion apparatus is not operable to perform the output in accordance with the output current value, the current-supplying time, the operation rate, and the resonance frequency that have been set, the control unit calculates a frequency lower than the set resonance frequency and at which the power conversion apparatus is operable to perform the output with the output current value, the current-supplying time, and the operation rate that have been set, and displays the calculated frequency on the display unit.

The power conversion apparatus may further include the display unit. When the control unit determines that the power conversion apparatus is not operable to perform the output in accordance with the output current value, the current-supplying time, the operation rate, and the resonance frequency that have been set, the control unit calculates the operation rate lower than the set operation rate and at which the power conversion apparatus is operable to perform the output with the output current value, the current-supplying time, and the resonance frequency that have been set, and displays the calculated operation rate on the display unit.

According to another aspect of the presently disclosed subject matter, a method for controlling the power conversion apparatus is provided. The method is performed by the control unit. The method includes steps of receiving an input for setting the output current value of the inverter, the current-supplying time of the inverter, the operation rate of the inverter and the resonance frequency of the load, determining whether the power conversion apparatus is operable to perform an output in accordance with the output current value, the current-supplying time, the operation rate, and the resonance frequency that have been set, based on a set of data in which the output frequency, the current-supplying time, and the operation rate of the inverter are associated with an allowable output current value of the inverter at a temperature equal to or lower than a maximum operable temperature of the switching device, and operating the rectifier and the inverter only when it is determined that power conversion apparatus is operable to perform the output.

According to another aspect of the presently disclosed subject matter, a computer program causes, when executed by a computer, the computer to execute the method described above. The computer program may be stored in a non-transitory computer readable medium.

This application claims priority to Japanese Patent Application No. 2017-223774 filed on Nov. 21, 2017, the entire content of which is incorporated herein by reference.

The invention claimed is:

1. A power conversion apparatus comprising:
a rectifier configured to convert a first alternating current (AC) power into constant-current direct current (DC) power;
a resonant inverter having a switching device, the resonant inverter being configured to convert the constant-current DC power received from the rectifier into a second AC power through on and off of the switching device and to output the second AC power to a load;
a control unit configured to receive settings of an output current value of the resonant inverter, a current-supplying time of the resonant inverter, and an operation rate of the resonant inverter defined by dividing the current-supplying time by a sum of the current-supplying time and a non-current-supplying time, and to operate the rectifier and the resonant inverter based on the output current value, the current-supplying time, and the operation rate of the resonant inverter that have been set; and
a display unit,
wherein the control unit is further configured to receive a setting of a resonance frequency of the load,
wherein the control unit is further configured to determine, based on a set of data in which an output frequency of the resonant inverter, the current-supplying time and the operation rate of the resonant inverter are associated with a first allowable output current value of the resonant inverter at a temperature equal to or lower than a maximum operable temperature of the switching device, whether the power conversion apparatus is operable to perform an output in accordance with the output current value, the current-supplying time, the operation rate, and the resonance frequency that have been set, and to operate the rectifier and the resonant inverter only when the control unit determines that the power conversion apparatus is operable to perform the output, and wherein when the control unit determines that the power conversion apparatus is not operable to perform the output in accordance with the output current value, the current-supplying time, the operation rate, and the resonance frequency that have been set, the control unit calculates a frequency lower than the set resonance frequency and at which the power conversion apparatus is operable to perform the output with the output current value, the current-supplying time, and the operation rate that have been set, and displays the calculated frequency on the display unit.

2. A power conversion apparatus comprising:

a rectifier configured to convert a first alternating current (AC) power into constant-current direct current (DC) power;

a resonant inverter having a switching device, the resonant inverter being configured to convert the constant-current DC power received from the rectifier into a second AC power through on and off of the switching device and to output the second AC power to a load;

a control unit configured to receive settings of an output current value of the resonant inverter, a current-supplying time of the resonant inverter, and an operation rate of the resonant inverter defined by dividing the current-supplying time by a sum of the current-supplying time and a non-current-supplying time, and to operate the rectifier and the resonant inverter based on the output current value, the current-supplying time, and the operation rate of the resonant inverter that have been set; and a display unit, wherein the control unit is further configured to receive a setting of a resonance frequency of the load, wherein the control unit is further configured to determine, based on a set of data in which an output frequency of the resonant inverter, the current-supplying time and the operation rate of the resonant inverter are associated with a first allowable output current value of the resonant inverter at a temperature equal to or lower than a maximum operable temperature of the switching device, whether the power conversion apparatus is operable to perform an output in accordance with the output current value, the current-supplying time, the operation rate, and the resonance frequency that have been set, and to operate the rectifier and the resonant inverter only when the control unit determines that the power conversion apparatus is operable to perform the output; and wherein when the control unit determines that the power conversion apparatus is not operable to perform the output in accordance with the output current value, the current-supplying time, the operation rate, and the resonance frequency that have been set, the control unit calculates an operation rate lower than the set operation rate and at which the power conversion apparatus is operable to perform the output with the output current value, the current-supplying time, and the resonance frequency that have been set, and displays the calculated operation rate on the display unit.

* * * * *